(12) United States Patent
Zhang et al.

(10) Patent No.: US 11,348,042 B2
(45) Date of Patent: *May 31, 2022

(54) SYSTEMS AND METHODS FOR DETERMINING PREDICTED DISTRIBUTION OF FUTURE TRANSPORTATION SERVICE TIME POINT

(71) Applicant: BEIJING DIDI INFINITY TECHNOLOGY AND DEVELOPMENT CO., LTD., Beijing (CN)

(72) Inventors: Lingyu Zhang, Beijing (CN); Wei Cheng, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 5 days.

This patent is subject to a terminal disclaimer.

(21) Appl. No.: 16/920,622

(22) Filed: Jul. 3, 2020

(65) Prior Publication Data

US 2020/0334591 A1 Oct. 22, 2020

Related U.S. Application Data

(63) Continuation of application No. 15/721,836, filed on Sep. 30, 2017, now Pat. No. 10,740,701, which is a (Continued)

(30) Foreign Application Priority Data

Mar. 3, 2016 (CN) .......................... 201610122417.4

(51) Int. Cl.
*G06Q 10/04* (2012.01)
*G06F 17/18* (2006.01)
(Continued)

(52) U.S. Cl.
CPC ............. *G06Q 10/04* (2013.01); *G06F 17/18* (2013.01); *G06Q 10/02* (2013.01); *G06Q 50/30* (2013.01); *G08G 1/20* (2013.01); *H04W 4/029* (2018.02)

(58) Field of Classification Search
CPC ........ G06Q 10/04; G06Q 10/02; G06Q 50/30; H04W 4/029; G06F 17/18; G08G 1/20
(Continued)

(56) References Cited

U.S. PATENT DOCUMENTS

| 6,317,720 B1 | 11/2001 | Murakami et al. |
| 2005/0033678 A1* | 2/2005 | Huneault ............... G06Q 40/08 705/36 R |

(Continued)

FOREIGN PATENT DOCUMENTS

| CN | 101808336 A | 8/2010 |
| CN | 103247167 A | 8/2013 |

(Continued)

OTHER PUBLICATIONS

"Estimating Taxi Demand-Supply Level using Taxi Trajectory Data Stream" Published by Institution for Infocomm Research (Year: 2015).*

(Continued)

*Primary Examiner* — Zeina Elchanti
(74) *Attorney, Agent, or Firm* — Metis IP LLC

(57) ABSTRACT

The present disclosure relates to systems and methods for determining a predicted distribution of future transportation service time point. The systems may perform the methods to obtain historical service time points of transportation service requests occurred in a predetermined region; determine a variance of the historical service time points; determine a predicted distribution of future transportation service time
(Continued)

point in the predetermined region based on the variance; and store the predicted distribution in a database.

20 Claims, 5 Drawing Sheets

Related U.S. Application Data continuation of application No. PCT/CN2016/109915, filed on Dec. 14, 2016.

(51) Int. Cl.
  *G06Q 10/02* (2012.01)
  *G06Q 50/30* (2012.01)
  *G08G 1/00* (2006.01)
  *H04W 4/029* (2018.01)

(58) Field of Classification Search
  USPC .......................................................... 705/5
  See application file for complete search history.

(56) References Cited

U.S. PATENT DOCUMENTS

| | | | |
|---|---|---|---|
| 2007/0118463 A1* | 5/2007 | Avery | G06Q 40/025 705/37 |
| 2008/0059273 A1 | 3/2008 | Miller | |
| 2009/0031271 A1 | 1/2009 | White et al. | |
| 2010/0095232 A1 | 4/2010 | Ramsay | |
| 2012/0109506 A1 | 5/2012 | Fei et al. | |
| 2013/0144831 A1* | 6/2013 | Atlas | G06Q 10/06 706/50 |
| 2013/0197890 A1* | 8/2013 | Ide | G01C 21/3484 703/6 |
| 2014/0180576 A1 | 6/2014 | Lamarca et al. | |
| 2015/0235133 A1* | 8/2015 | Aoki | G06N 20/00 706/12 |
| 2015/0278759 A1 | 10/2015 | Harris et al. | |
| 2016/0117610 A1 | 4/2016 | Ikeda et al. | |
| 2016/0364669 A1 | 12/2016 | Wang et al. | |
| 2017/0109631 A1* | 4/2017 | Cheng | G06Q 10/047 |
| 2017/0131112 A1 | 5/2017 | Ogawa et al. | |
| 2021/0269754 A1* | 9/2021 | Kikuchi | C12M 23/06 |

FOREIGN PATENT DOCUMENTS

| | | |
|---|---|---|
| CN | 103985247 A | 8/2014 |
| CN | 104599088 A | 5/2015 |
| CN | 104636674 A | 5/2015 |
| CN | 105139089 A | 12/2015 |
| CN | 105203942 A | 12/2015 |
| CN | 105279572 A | 1/2016 |
| JP | 2003196791 A | 7/2003 |
| JP | 2008052455 A | 3/2008 |
| JP | 2011108193 A | 6/2011 |
| JP | 5232298 B2 | 7/2013 |
| JP | 2013136381 A | 7/2013 |
| WO | 2011069170 A1 | 6/2011 |

OTHER PUBLICATIONS

International Search Report in PCT/CN2016/109915 dated Mar. 21, 2017, 5 pages.
Extended European Search Report in European Application No. 16892380.3 dated Mar. 23, 2018, 9 pages.
Notice of Preliminary Rejection in Korean Application No. 10-2017-7028460 dated May 24, 2018, 14 pages.
Written Opinion in PCT/CN2016/109915 dated Mar. 21, 2017, 4 pages.
Notice of Rejection in Japanese Application No. 2017-552975 dated Jun. 4, 2019, 10 pages.
Jim Frost, How to Identify the Distribution of Your Data, Statistics By Jim, 2017, 8 pages.
Written Opinion and Search Report in Singaporean Application No. 11201708267Y dated Dec. 5, 2019, 7 pages.
First Office Action in Chinese Application No. 201610122417.4 dated Mar. 6, 2020, 12 pages.
Shao, Dongxu et al., Estimating Taxi Demand-Supply Level using Taxi Trajectory Data Stream, 2015 IEEE International Conference on Data Mining Workshop (ICDMW), 2015, 7 pages.
Notice of Reasons for Rejection in Japanese Application No. 2020-121793 dated Nov. 2, 2021, 6 pages.
First Office Action in Chinese Application No. 201680083128.6 dated Jul. 12, 2021, 14 pages.

* cited by examiner

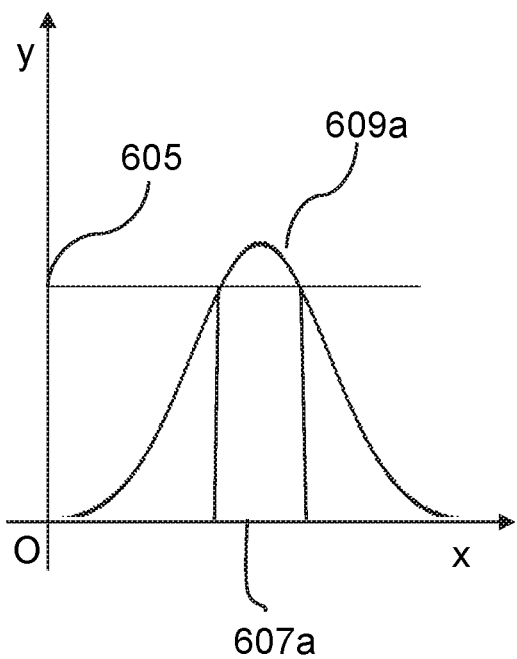 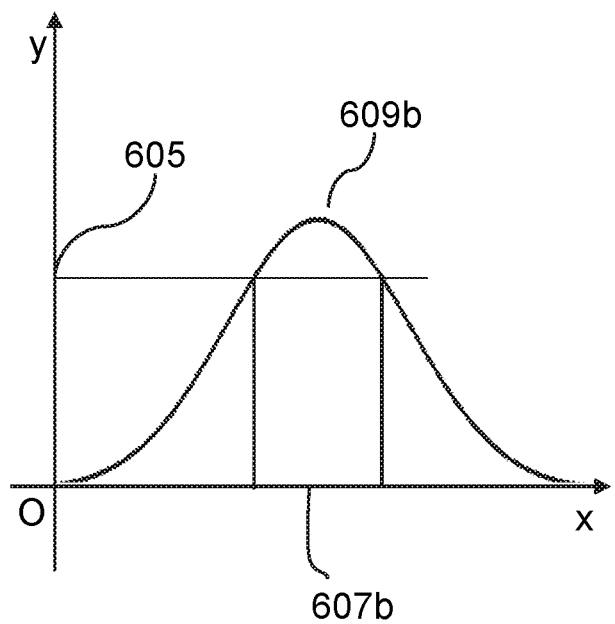
FIG. 6-A          FIG. 6-B

SYSTEMS AND METHODS FOR DETERMINING PREDICTED DISTRIBUTION OF FUTURE TRANSPORTATION SERVICE TIME POINT

CROSS-REFERENCE TO RELATED APPLICATIONS

This application is a continuation application of U.S. patent application Ser. No. 15/721,836, filed on Sep. 30, 2017, which is a continuation of International Application No. PCT/CN2016/109915, filed on Dec. 14, 2016, which claims priority to Chinese Application No. 201610122417.4 filed on Mar. 3, 2016, the contents of each of which are incorporated herein by reference.

TECHNICAL FIELD

The present disclosure generally relates to systems and methods for on-demand service, and in particular, systems and methods for determining a predicted distribution of future transportation service time point.

BACKGROUND

With the development of Internet technology, on-demand transportation services, such as online taxi hailing services, have become more and more popular. The demand for transportation services may be large in traffic peak period, whereas in idle period, the demand may be small. Under some situations, it may be difficult to meet the demand for transportation services efficiently.

SUMMARY

According to an aspect of the present disclosure, a system may include one or more storage media and one or more processors configured to communicate with the one or more storage media. The one or more storage media may include a set of instructions for determining a predicted distribution of future transportation service time point. When the one or more processors executing the set of instructions, the one or more processors may be directed to perform one or more of the following operations. The one or more processors may obtain historical service time points of transportation service requests occurred in a predetermined region. The one or more processors may determine a variance of the historical service time points. The one or more processors may determine a predicted distribution of future transportation service time point in the predetermined region based on the variance. The one or more processors may then store the predicted distribution in a database.

In some embodiments, the one or more processors may receive a request of a transportation service frequency that is associated with a first predetermined time period from a user terminal. The one or more processors may obtain a result transportation service frequency by applying the first predetermined time period to the predicted distribution. The one or more processors may then send the result transportation service frequency to the user terminal.

In some embodiments, the one or more processors may determine an average service time point of the historical service time points. The one or more processors may determine the number of the historical service time points. The one or more processors may then determine the variance of the historical service time points based on the average service time point of the historical service time points and the number of the historical service time points.

In some embodiments, the one or more processors may determine that the number of historical transportation service requests in a second predetermined time period may be smaller than a first threshold value, so that accuracy of the predicted distribution of future transportation service time point may be lower than a second threshold value. The one or more processors may determine a correction coefficient relating to the number of the historical service time points. The one or more processors may then apply the correction coefficient to the variance of the historical service time points to increase prediction accuracy.

In some embodiments, the correction coefficient may be an empirical value.

In some embodiments, the one or more processors may determine a fluctuation range relating to the variance. The one or more processors may then determine the predicted distribution of future transportation service time point based on the fluctuation range.

In some embodiments, the one or more processors may determine a standard deviation of the historical service time points. The one or more processors may determine a distribution model relating to the variance based on the variance, the standard deviation, and the number of the historical service time points. The one or more processors may then determine the fluctuation range relating to the variance based on the distribution model.

In some embodiments, the distribution model may be a distribution model relating to a quadratic sum of multiple normal distribution variables.

In some embodiments, the one or more processors may obtain a plurality of variance values based on the fluctuation range relating to the variance. The one or more processors may determine a first predicted distribution of future transportation service time point based on the variance value for each of the plurality of variance values. The one or more processors may then determine a second predicted distribution of future transportation service time point based on a plurality of first predicted distributions of future transportation service time point.

In some embodiments, the one or more processors may determine an expectation of the historical service time points. The one or more processors may determine a normal distribution based on the expectation and the variance value. The one or more processors may then determine the first predicted distribution of future transportation service time point based on the normal distribution.

In some embodiments, the one or more processors may weigh the plurality of first predicted distributions of future transportation service time point. The one or more processors may then determine the second predicted distribution of future transportation service time point based on the weighing result.

According to another aspect of the present disclosure, a method may include one or more of the following operations. A computer may obtain historical service time points of transportation service requests occurred in a predetermined region. The computer server may determine a variance of the historical service time points. The computer server may determine a predicted distribution of future transportation service time point in the predetermined region based on the variance. The computer server may then store the predicted distribution in a database.

In some embodiments, the computer server may receive a request of a transportation service frequency that is associated with a first predetermined time period from a user terminal. The computer server may obtain a result transportation service frequency by applying the first predetermined time period to the predicted distribution. The computer server may then send the result transportation service frequency to the user terminal.

In some embodiments, the computer server may determine an average service time point of the historical service time points. The computer server may determine the number of the historical service time points. The computer server may then determine the variance of the historical service time points based on the average service time point of the historical service time points and the number of the historical service time points.

In some embodiments, the computer server may determine that the number of historical transportation service requests in a second predetermined time period may be smaller than a first threshold value, so that accuracy of the predicted distribution of future transportation service time point may be lower than a second threshold value. The computer server may determine a correction coefficient relating to the number of the historical service time points. The computer server may then apply the correction coefficient to the variance of the historical service time points to increase prediction accuracy.

In some embodiments, the correction coefficient may be an empirical value.

In some embodiments, the computer server may determine a fluctuation range relating to the variance. The computer server may then determine the predicted distribution of future transportation service time point based on the fluctuation range.

In some embodiments, the computer server may determine a standard deviation of the historical service time points. The computer server may determine a distribution model relating to the variance based on the variance, the standard deviation, and the number of the historical service time points. The computer server may then determine the fluctuation range relating to the variance based on the distribution model.

In some embodiments, the distribution model may be a distribution model relating to a quadratic sum of multiple normal distribution variables.

In some embodiments, the computer server may obtain a plurality of variance values based on the fluctuation range relating to the variance. The computer server may determine a first predicted distribution of future transportation service time point based on the variance value for each of the plurality of variance values. The computer server may then determine a second predicted distribution of future transportation service time point based on a plurality of first predicted distributions of future transportation service time point.

In some embodiments, the computer server may determine an expectation of the historical service time points. The computer server may determine a normal distribution based on the expectation and the variance value. The computer server may then determine the first predicted distribution of future transportation service time point based on the normal distribution.

In some embodiments, the computer server may weigh the plurality of first predicted distributions of future transportation service time point. The computer server may then determine the second predicted distribution of future transportation service time point based on the weighing result.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 6-A and 6-B are schematic diagrams illustrating exemplary predicted distributions of future transportation service time point according to some embodiments of the present disclosure.

DETAILED DESCRIPTION

Figure 1:
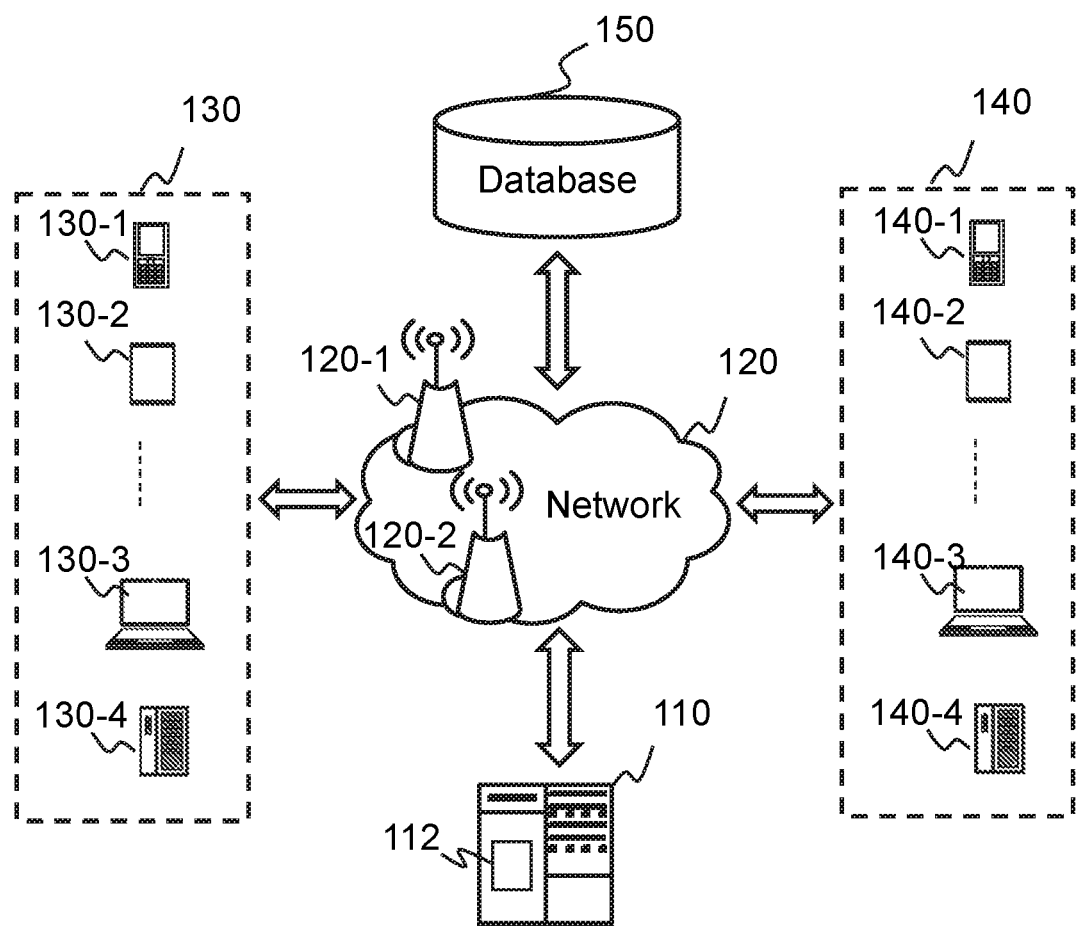
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to determining a target vehicle/provider, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure provides online systems and methods for determining a predicted distribution of future transportation service time point based on historical service time points of transportation service requests.

It should be noted that online on-demand transportation services, such as online taxi hailing, is a new form of service rooted only in post-Internet era. It provides technical solutions to users and service providers that could raise only in post-Internet era. In pre-Internet era, when a user calls for a taxi on street, the taxi request and acceptance occur only between the passenger and one taxi driver that sees the passenger. If the passenger calls a taxi through telephone call, the service request and acceptance may occur only between the passenger and one service provider (e.g., one taxi company or agent). Online taxi hailing, however, allows a user of the service to real-time and automatic distribute a service request to a vast number of individual service providers (e.g., taxi) distance away from the user. It also allows a plurality of service provides to respond to the service request simultaneously and in real-time. Therefore, through Internet, the online on-demand transportation systems may provide a much more efficient transaction platform for the users and the service providers that may never met in a traditional pre-Internet transportation service system.

FIG. 1 is a block diagram illustrating an exemplary on-demand service system 100 according to some embodiments. The on-demand service system 100 may be an online on-demand transportation service system including a server 110, a network 120, a requestor terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a predicted distribution of future transportation service time point based on historical service time points. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the requestor terminal 130, the provider terminal 140, and the database 150) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with other positioning device to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140, etc.). In some embodiments, the database 150 may be part of the server 110.

In some embodiments, one or more components in the on-demand service system 100 (e.g., the server 110, the requestor terminal 130, the provider terminal 140, etc.) may have a permission to access the database 150. In some embodiments, one or more components in the on-demand service system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
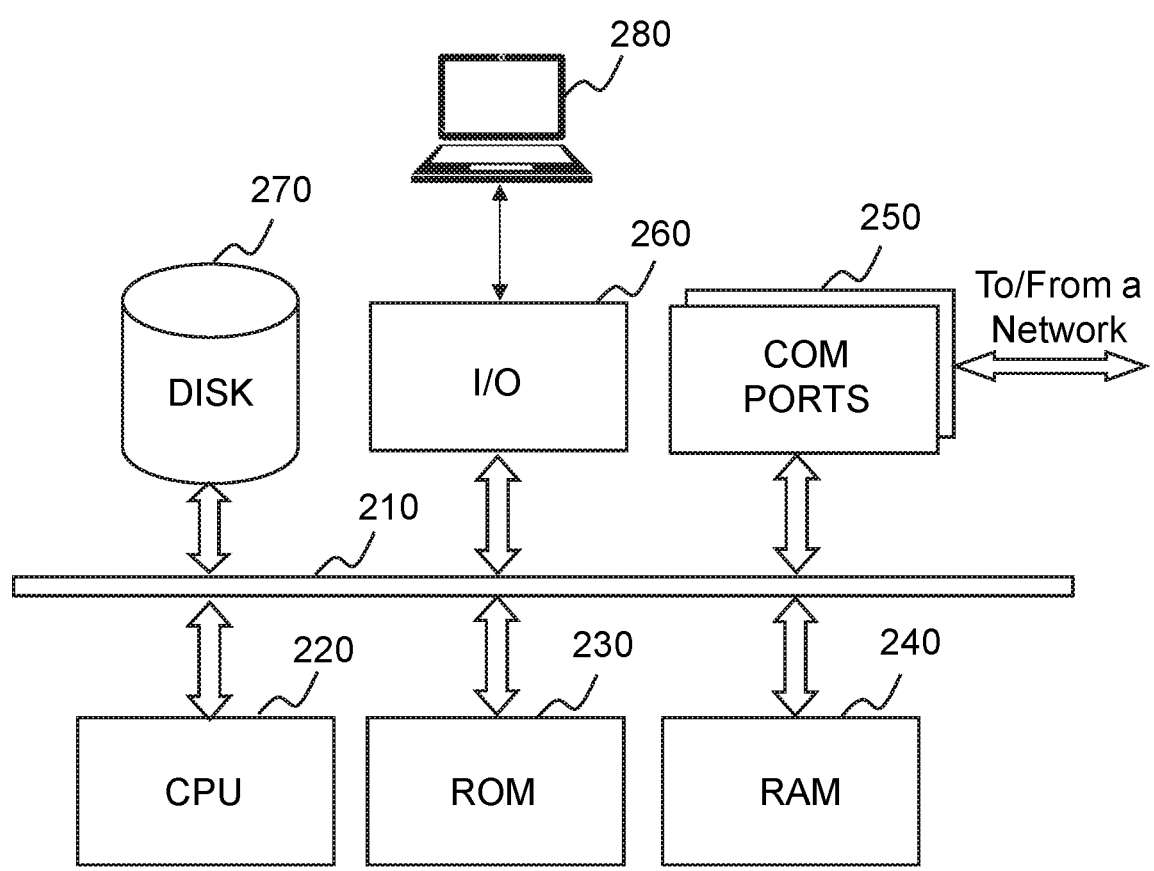
FIG. 2 is a block diagram illustrating an exemplary computing device in the on-demand service system according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand service system 100 for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
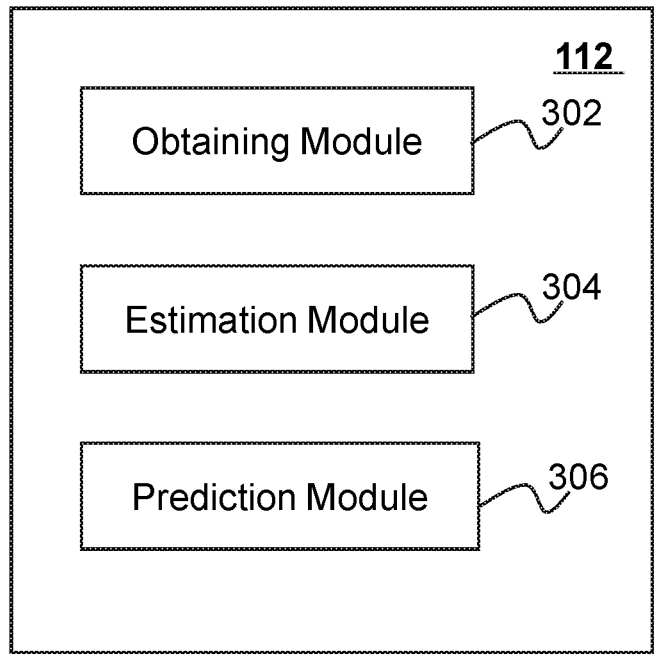
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an obtaining module 302, a determination module 304, and a prediction module 306.

The obtaining module 302 may be configured to obtain historical service time points of transportation service requests occurred in a predetermined region. As used herein, the service time point may refer to a start time when a requestor wishes to use a transportation service. The predetermined region may refer to an administrative area (e.g., a district in a city), or a geographical region (e.g., within a certain radius (e.g., 500 m, 800 m, 1 km) from a defined location).

The determination module 304 may be configured to determine a variance of the historical service time points. For example, the determination module 304 may estimate the variance of the historical service time points based on an unbiased estimation approach. The determination module 304 may further determine a distribution model relating to the variance. Through the distribution model, the determination module 304 may determine possible values of the variance with different probabilities. The determination module 304 may further determine a fluctuation range relating to the variance based on the distribution model. The fluctuation range may indicate a range within which the value of the variance may vary. The fluctuation range may include a start value and an end value. For example, the fluctuation range may be (3, 5) or [3, 5]. The start value is 3 and the end value is 5.

The prediction module 306 may be configured to determine a predicted distribution of future transportation service time point in the predetermined region based on the variance. The predicted distribution of future transportation service time point may refer to a distribution through which a user (e.g., a requestor or a provider) may obtain one or more time points when possible future transportation service time point may occur in the predetermined region.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the determination module 304 and the prediction module 306 may be integrated as a single module which may both determine a variance and determine a predicted distribution of future service time point.

Figure 4:
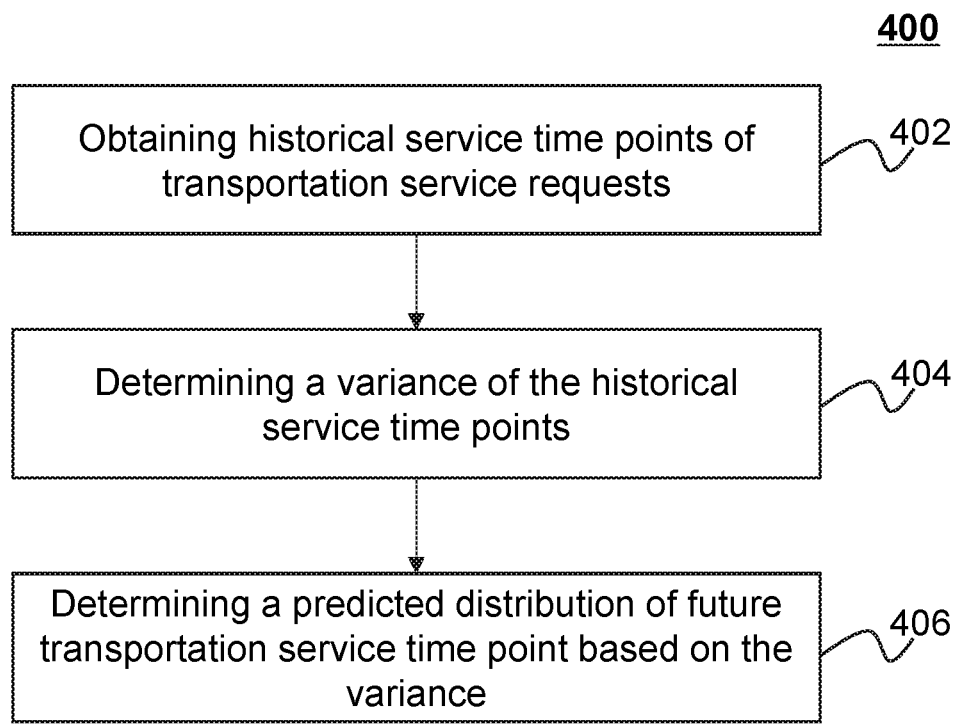
FIG. 4 is a flowchart illustrating an exemplary process/method for determining a predicted distribution of future transportation service time point according to some embodiments of the present disclosure.

FIG. 4 is a flowchart illustrating an exemplary process/method 400 for determining a predicted distribution of future transportation service time point in a predetermined region according to some embodiments of the present disclosure. The process and/or method 400 may be executed by the on-demand service system 100. For example, the process and/or method may be implemented as a set of instructions (e.g., an application) stored in the storage ROM 230 or RAM 240. The CPU 210 may execute the set of instructions and may accordingly be directed to perform the process and/or method 400.

In step 402, the processing engine 112 may obtain historical service time points of transportation service requests occurred in a predetermined region.

The service time point may refer to a start time when a requestor wishes to use a transportation service. The transportation service request may include a real-time request and/or an appointment request. As used herein, a real-time request may be a request that the requestor wishes to use a transportation service at the present moment or at a defined time reasonably close to the present moment for an ordinary person in the art. For example, a request may be a real-time request if the defined time is shorter than a threshold value, such as 1 minute, 5 minutes, 10 minutes or 20 minutes. The appointment request may refer to that the requestor wishes to use a transportation service at a defined time which is reasonably far from the present moment for the ordinary person in the art. For example, a request may be an appointment request if the defined time is longer than a threshold value, such as 20 minutes, 2 hours, or 1 day. In some embodiments, the processing engine 112 may define the real-time request or the appointment request based on a time threshold. The time threshold may be default settings of the on-demand service system 100, or may be adjustable depending on different situations. For example, in a traffic peak period, the time threshold may be relatively small (e.g., 10 minutes), otherwise in idle period (e.g., 10:00-12:00 am), the time threshold may be relatively large (e.g., 1 hour).

In some embodiments, the "historical" used herein may refer to a predetermined time period in the past. For example, the processing engine 112 may obtain the historical service time points within a month from the present moment in the past. As another example, the processing engine 112 may obtain the historical service time points within a specific time period in the past (e.g., a Christmas holiday in last year).

The predetermined region may be default settings of the on-demand service system 100, or may be adjustable depending on different situations. For example, for a middle-sized city or a small city, the predetermined region may be the whole city, whereas for a large city (e.g., Beijing), the predetermined region may be a district or a defined portion of the district in the city.

In step 404, the processing engine 112 may determine a variance of the historical service time points.

As used herein, the variance may indicate dispersion degree of a set of random variable values. In the present disclosure, the variance may indicate dispersion degree of the historical service time points. It should be noted that in the present disclosure, "variance", "standard deviation", or "expectation" may refer to a specific value determined according to a formula or an estimator of the "variance", "standard deviation", or "expectation" to be estimated.

The processing engine 112 may determine the variance of the historical service time points based on an unbiased estimation approach. As used herein, the unbiased estimation approach may refer to that for a parameter to be estimated, an expectation of an estimator of the parameter is equal to an actual value of the parameter. For example, the unbiased estimation approach may be expressed as below:

$$E(M')=M \quad (1)$$

where M refers to a parameter to be estimated (or an actual value of the parameter), M' refers to an estimator of the parameter, and E(M') refers to an expectation of the estimator of the parameter. As used herein, the expectation may refer to a probability-weighted average of possible values of the estimator. For example, the estimator may include a plurality of possible values illustrated below:

$$M'=\{m_1, m_2, \ldots, m_n\} \quad (2)$$

where the plurality of possible values may correspond to a plurality of possibilities, for example, $p_1, p_2, \ldots,$ and $p_n$. Further, the expectation of the estimator may be expressed as below:

$$E(M')=p_1 m_1 + p_2 m_2 + \ldots + p_n m_n \quad (3)$$

In some embodiments, if the number of the historical service time points is larger than or equal to a first threshold (e.g., 100), the processing engine 112 may determine a first variance according to formula (4) below:

$$D_1(X) = \frac{1}{n}\sum_{i=1}^{n}(t_i - \bar{t})^2 \quad (4)$$

where $D_1(X)$ refers to the first variance, X refers to a set including the historical service time points, $t_i$ refers to an ith historical service time point, $\bar{t}$ refers to an average service time point of the historical service time points, and n refers to the number of the historical service time points.

In some embodiments, if the number of the historical service time points is less than the first threshold but larger than or equal to a second threshold (e.g., 10), it may be inaccurate to determine the variance of the historical service times according to formula (4). The inaccurate variance may result in that the accuracy of the predicted distribution of future transportation service time point may be lower than an accuracy threshold (e.g., 70%). As used herein, "accuracy" may refer to an error between the predicted distribution and a reference distribution, and the reference distribution may refer to a distribution that is determined based on an actual variance of the historical service time points or a default value of the variance of the historical service time points. In order to improve accuracy, the processing engine 112 may determine a second variance according to formula (5) below:

$$D_2(X) = \frac{1}{n-1}\sum_{i=1}^{n}(t_i - \bar{t})^2 \qquad (5)$$

where $D_2(X)$ refers to the second variance.

In some embodiments, in order to determine formula (5) above, the processing engine 112 may determine an expectation of the first variance according to formula (6) below. It should be noted that in this situation the "first variance" refers to an estimator of the variance of the historical service time points.

$$E(D_1(X)) = E\left(\frac{\sum_{i=1}^{n}(t_i - \bar{t})^2}{n}\right) \qquad (6)$$

$$= E\left(\frac{\sum_{i=1}^{n}t_i^2 - \sum_{i=1}^{n}2t_i \cdot \bar{t} + \sum_{i=1}^{n}\bar{t}^2}{n}\right)$$

$$= \frac{1}{n}\left\{E\left(\sum_{i=1}^{n}(t_i^2)\right) - E\left(2\bar{t}\sum_{i=1}^{n}(t_i)\right) + E\left(\sum_{i=1}^{n}\bar{t}^2\right)\right\}$$

$$= \frac{1}{n}\left\{E\left(\sum_{i=1}^{n}(t_i^2)\right) - n \cdot E(\bar{t}^2)\right\}$$

$$= \frac{1}{n}E\left(\sum_{i=1}^{n}(t_i^2)\right) - E(\bar{t}^2)$$

$$= \frac{1}{n}\left(\sum_{i=1}^{n}E(t_i^2)\right) - E(\bar{t}^2)$$

where $E(D_1(X))$ refers to the expectation of the first variance, $E(t_i^2)$ refers to an expectation of squares of the historical service time points, and $E(\bar{t}^2)$ refers to an expectation refers to an expectation of a square of the average service time point.

For an ordinary person in the art, it is known that:

$$D_1(\bar{t}) = E(\bar{t}^2) - E(\bar{t})^2 \qquad (7)$$

where $D_1(\bar{t})$ refers to a first variance of the average service time point of the historical service time points.

According to formula (7) above, the processing engine 112 may further determine that:

$$E(\bar{t}^2) = E(\bar{t})^2 + D_1(\bar{t}) \qquad (8)$$

$$= E(\bar{t})^2 + D_1\left(\frac{\sum_{i=1}^{n}t_i}{n}\right)$$

$$= E(\bar{t})^2 + \frac{1}{n}\sum_{i=1}^{n}D_1(t_i)$$

$$= \mu_0^2 + \frac{\sigma_0^2}{n}$$

where $\mu_0$ refers to an actual value of an expectation of the historical service time points, and $\sigma_0$ refers to an actual value of a standard deviation of the historical service time points.

Further, according to formula (6) and formula (8) above, the processing engine 112 may determine the expectation of the first variance as below:

$$E(D_1(X)) = \frac{1}{n}\left[n(\sigma_0^2 + \mu_0^2) - n\left(\mu_0^2 + \frac{\sigma_0^2}{n}\right)\right] \qquad (9)$$

$$= \frac{n-1}{n} \cdot \sigma_0^2$$

it may be seen that when the number of the historical service time points is large enough, the expectation of the first variance may approximate to the square of the actual standard deviation as illustrated below:

$$E(D_1(X)) = \lim_{n \to \infty} \frac{n-1}{n} \cdot \sigma_0^2 = \sigma_0^2 \qquad (10)$$

According to formula (10) above, the processing engine 112 may determine a relationship between the expectation of the first variance and the actual standard deviation as illustrated in formula (11) or formula (12) below:

$$\frac{n}{n-1} \cdot E(D_1(X)) = \sigma_0^2 \qquad (11)$$

$$E\left(\frac{n}{n-1} \cdot D_1(X)\right) = \sigma_0^2 \qquad (12)$$

Refer back to formula (4) and formula (5), it may be seen that the second variance may be in relation with the first variance:

$$D_2(X) = \frac{n}{n-1} \cdot D_1(X) \qquad (13)$$

It may be seen from formula (12) that an expectation of the second variance is equal to the square of the standard deviation of the historical service time points. Therefore, when the number of the historical service time points is less than the first threshold but larger than or equal to the second threshold (e.g., 10), it may be more accurate to determine the variance of the historical service time points according to formula (5) than according to formula (4).

In some embodiments, the number of the historical service time points may be less than the second threshold (e.g., 10). In this situation, it may be inaccurate to determine the variance of the historical service time points according to formula (4) or formula (5). The processing engine 112 may take a correction coefficient into consideration and determine a third variance according to formula (14) below:

$$D_3(X) = \frac{1}{n-1} \sum_{i=1}^{n} (t_i - \bar{t}) + \eta \qquad (14)$$

where $D_3(X)$ refers to the third variance, and $\eta$ refers to the correction coefficient. The correction coefficient may be default settings of the on-demand service system 100 (e.g., an empirical value), or may be adjustable depending on different situations. For example, the processing engine 112 may determine the correction coefficient according to formula (15) below:

$$\eta = \min\left[1, \max\left(0.2, \frac{1}{lgn}\right)\right] \qquad (15)$$

In step 406, the processing engine 112 may determine a predicted distribution of future transportation service time point in the predetermined region based on the first variance, the second variance, or the third variance.

For example, the processing engine 112 may determine a predicted distribution based on the expectation of the historical service time points and the first variance, the second variance, or the third variance. In the predicted distribution, the horizontal coordinate may refer to service time point, the vertical coordinate may refer to a probability corresponding to the service time point. For example, the predicted distribution may be a normal distribution (e.g., a normal distribution 609a illustrated in FIG. 6-A, or a normal distribution 609b illustrated in FIG. 6-B).

After the processing engine 112 determines the predicted distribution of future transportation service time point, the processing engine 112 may transmit the data of the predicted distribution to the database 150 or any storage device (e.g., the ROM 230, the RAM 240) disclosed elsewhere in the present disclosure. In some embodiments, according to the predicted distribution, the processing engine 112 may determine a specific time interval within which a transportation service frequency may be larger than a frequency threshold (e.g., 80%). As used herein, the transportation service frequency may refer to a probability corresponding to a service time point at which a transportation service request may appear. The processing engine 112 may further provide a notification to a plurality of providers in the predetermined region prior to the specific time interval to notify the plurality of providers that a transportation service peak may appear in the predetermined region.

In some embodiments, a user (e.g., a requestor, a provider) may send a request of transportation service frequency that appears in a predetermined future time period (e.g., a Christmas holiday in this year) to the on-demand service system 100 via a user terminal (e.g., the requestor terminal 130, the provider terminal 140). When the processing engine 112 receives the request, the processing engine 112 may apply the future time period to the predicted distribution, obtain a prediction result of the transportation service frequency to the future time period, and send the result to the user terminal.

In some embodiments, the user may also send a request to the on-demand service system 100 to predict a future time period when the transportation service frequency is within a predetermined range. Accordingly, the processing engine 112 may apply the predetermined transportation service frequency range to the predicted distribution and obtain a result time period for the user. For example, a user may send a request for a time interval within which the transportation service frequency is larger than a frequency threshold (e.g., 80%). The processing engine 112 may apply the predicted distribution, determine the time interval (e.g., 9:00-10:00 AM) that next transportation service frequency larger than the frequency threshold will occur, and send the time interval to the user terminal.

Figure 5:
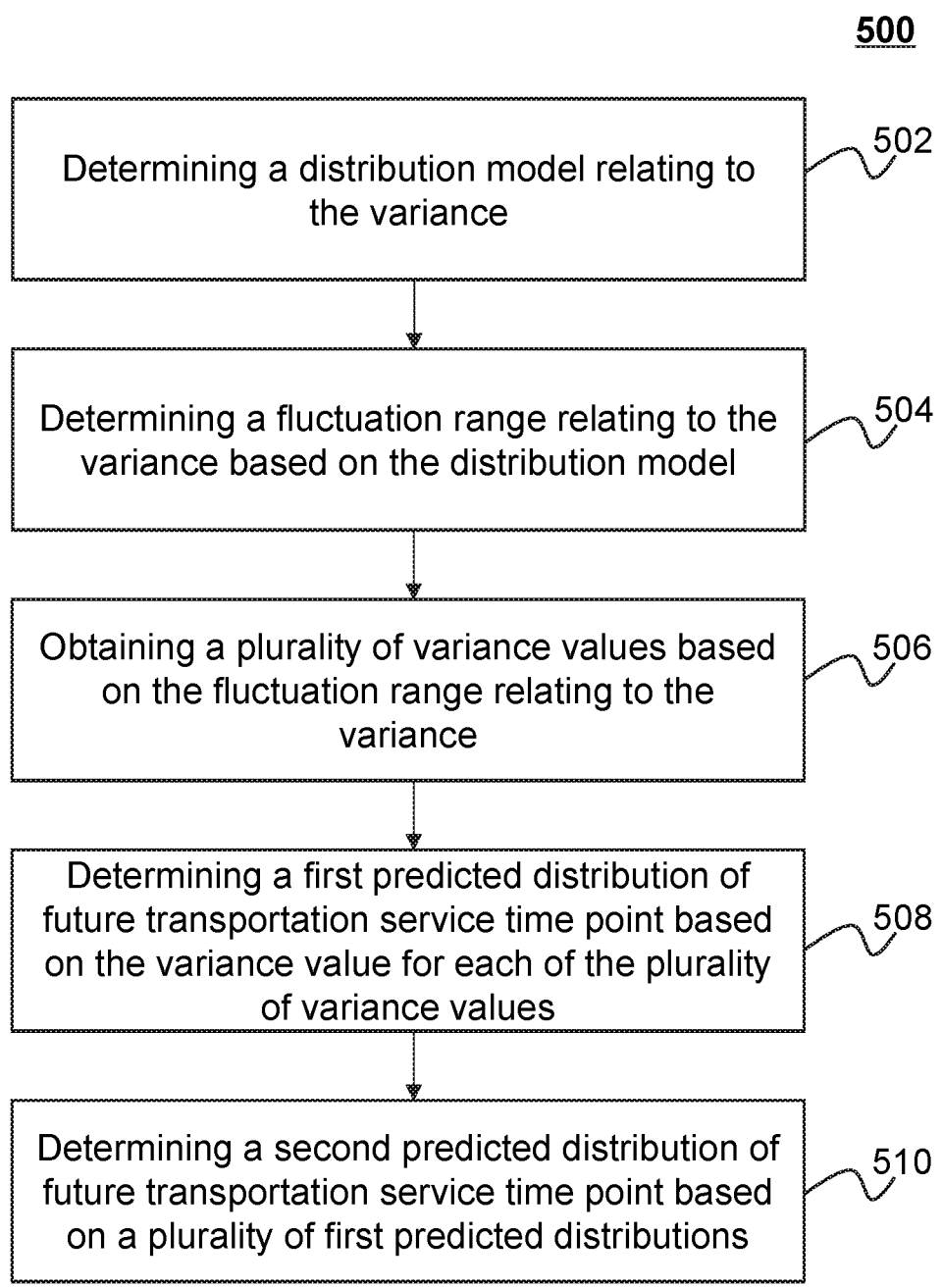
FIG. 5 is a flowchart illustrating an exemplary process/method for determining a predicted distribution of future transportation service time point according to some embodiments of the present disclosure.

FIG. 5 is a flowchart illustrating an exemplary process/method 500 for determining a predicted distribution of future transportation service time point according to some embodiments of the present disclosure. The process and/or method 500 may be executed by the on-demand service system 100. For example, the process and/or method may be implemented as a set of instructions (e.g., an application) stored in the storage ROM 230 or RAM 240. The CPU 210 may execute the set of instructions and may accordingly be directed to perform the process and/or method 500.

In step 502, the processing engine 112 may determine a distribution model relating to the variance.

As used herein, the distribution model may indicate possible values of the variance with different probabilities.

As described in connection with step 404, in some situations, the variance determined according to formula (4), formula (5), or formula (14) may be inaccurate. For example, if an error occurs during an acquisition process of the historical service time points (e.g., missing one or more service time points), the variance determined according to formula (4), formula (5), or formula (14) may deviate from the actual value of the actual variance. Therefore, in order to improve accuracy, the processing engine 112 may determine the distribution model relating to the variance and determine possible values of the variance based on the distribution model.

For example, for the second variance, the processing engine 112 may determine a variance parameter relating to the second variance according to formula (16) below:

$$G = D_2(X) \cdot \frac{n-1}{\sigma^2} \qquad (16)$$

where G refers to the variance parameter relating to the second variance.

It is known that the historical service time points may follow a first normal distribution. The processing engine 112 may further determine a time parameter relating to the historical service time points based on the first normal distribution:

$$Z_i = \frac{t_i - \mu}{\sigma} \qquad (17)$$

where $Z_i$ refers to an ith time parameter relating to the historical service time points, $t_i$ refers to the ith historical service time point, $\mu$ refers to an expectation of the historical service time points, and σ refers to an standard deviation of the historical service time points. It may be seen that the time parameters relating to the historical service time points follow a standard normal distribution (hereafter the distribution of the time parameters referred to as a "second normal distribution").

The processing engine 112 may further determine a first column matrix corresponding to the time parameters relating to the historical service time points as illustrated below:

$$Z = \begin{pmatrix} Z_1 \\ Z_2 \\ \cdots \\ Z_n \end{pmatrix} \quad (18)$$

where Z refers to the first column matrix, and n refers to the number of historical service time points.

The processing engine 112 may determine a relationship between the second variance and the time parameter according to formula (19) below:

$$D_2(X) = \frac{\sigma^2}{n-1}\left\{\frac{\sum_{i=1}^n (t_i - \bar{t})^2}{\sigma^2}\right\} = \frac{\sigma^2}{n-1}\left\{\frac{\sum_{i=1}^n [(t_i - \mu) - (\bar{t} - \mu)]^2}{\sigma^2}\right\} = \frac{\sigma^2}{n-1}\sum_{i=1}^n (Z_i - \bar{Z})^2 = \frac{\sigma^2}{n-1}\left(\sum_{i=1}^n Z_i^2 - n \cdot \bar{Z}^2\right) \quad (19)$$

where $\bar{Z}$ refers to an average of the time parameters.

The processing engine 112 may further determine a second column matrix whose elements follow a third normal distribution according to formula (20) below:

$$Y = A \cdot Z \quad (20)$$

where Y refers to the second column matrix illustrated below:

$$Y = \begin{pmatrix} Y_1 \\ Y_2 \\ \cdots \\ Y_n \end{pmatrix} \quad (21)$$

and A refers to an n-order orthogonal matrix (hereafter referred to as a "third matrix") which is similar to the first column matrix illustrated below:

$$A = \begin{bmatrix} \frac{1}{\sqrt{n}} & \frac{1}{\sqrt{n}} & \cdots & \frac{1}{\sqrt{n}} \\ a_{21} & a_{22} & & a_{2n} \\ \vdots & & \ddots & \vdots \\ a_{n1} & a_{n2} & \cdots & a_{nn} \end{bmatrix} \quad (22)$$

According to formula (20), formula (21), and formula (22) above, the processing engine 112 may determine the elements of the second column matrix as below:

$$Y_i = \sum_{j=1}^n a_{ij} \cdot Z_j \quad (23)$$

where $Y_i$ refers to the ith element of the second column matrix, $a_{ij}$ refers to an element placed in the ith row and jth column in the third matrix, $Z_j$ refers to the jth time parameter.

It may be seen that the first column matrix includes n time parameters, for any two time parameters in the first column matrix, the two time parameters are independent with each other. Therefore, the processing engine 112 may determine that:

$$COV(Z_i, Z_j) = \delta_{ij} \quad (24)$$

where $Z_i$ refers to the ith time parameter in the first column matrix, $Z_j$ refers to the jth time parameter in the first column matrix, $cov(Z_i, Z_j)$ refers to a covariance of the two time parameters, and $\delta_{ij}$ refers to the Kronecker delta. For the Kronecker delta, if the value of i is equal to the value of j, the value of the Kronecker delta is 1, whereas, if the value i is not equal to the value of j, the value of the Kronecker delta is 0.

The processing engine 112 may determine a covariance of any two elements in the second column matrix as below:

$$cov(Y_s, Y_t) = cov\left(\sum_{j=1}^n a_{sj} \cdot Z_j, \sum_{i=1}^n a_{ti} \cdot Z_i\right) = \sum_{i=1}^n \sum_{j=1}^n a_{ti} \cdot a_{sj} \cdot cov(Z_i, Z_j) = \sum_{i=1}^n a_{ti} \cdot a_{sj} \cdot \delta_{ij} \quad (25)$$

where $Y_s$ refers to the sth element in the second column matrix, $Y_t$ refers to the tth element in the second column matrix. It may be seen that any two elements in the second column matrix are independent with each other.

The processing engine 112 may further determine a quadratic sum of the elements in the second column matrix according to formula (26) below:

$$\sum_{i=1}^n Y_i^2 = Y^T \cdot Y = (A \cdot Z)^T \cdot (A \cdot Z) = Z^T \cdot A^T \cdot A \cdot Z = Z^T \cdot Z = \sum_{i=1}^n Z_i^2 \quad (26)$$

For the first element in the second column matrix, the processing engine 112 may determine that:

$$Y_1 = \sum_{i=1}^n a_{1i} \cdot Z_i = \sum_{i=1}^n \frac{1}{\sqrt{n}} \cdot Z_i = \frac{1}{\sqrt{n}} \cdot n \cdot \bar{Z} = \sqrt{n} \cdot \bar{Z} \quad (27)$$

According to formula (19), formula (23), and formula (26), the processing engine 112 may modify the second variance as below:

$$D_2(X) = \frac{\sigma^2}{n-1}\left(\sum_{i=1}^n Z_i^2 - n \cdot \bar{Z}^2\right) = \frac{\sigma^2}{n-1}\left(\sum_{i=1}^n Y_i^2 - Y_1^2\right) = \frac{\sigma^2}{n-1}\sum_{i=2}^n Y_i^2 \quad (28)$$

According to formula (28), the processing engine 112 may determine a relationship between the variance parameter and the elements in the second column matrix as below:

$$G = D_2(X) \cdot \frac{n-1}{\sigma^2} = \sum_{i=2}^n Y_i^2 \quad (29)$$

it is obvious that the distribution of the variance parameter is equivalent to the distribution of the elements in the second column matrix, that is, the distribution model of the variance parameters is equivalent to a distribution model of (n−1) normal distribution variables (herein referred to $Y_i$).

In step 504, the processing engine 112 may determine a fluctuation range relating to the variance based on the distribution model. For example, the processing engine 112 may determine the fluctuation range according to formula (30) below:

$$P\left\{x_{1-\frac{a}{2}}^2(n-1) < \frac{n-1}{\sigma^2}D_2 < x_{\frac{a}{2}}^2(n-1)\right\} = 1 - a \tag{30}$$

The processing engine 112 may transform equation (30) as below:

$$P\left\{\frac{(n-1)\cdot D_2}{x_{\frac{a}{2}}^2(n-1)} < \sigma^2 < \frac{(n-1)\cdot D_2}{x_{1-\frac{a}{2}}^2(n-1)}\right\} = 1 - a \tag{31}$$

where a refers to a confidence coefficient of the distribution model $$x_{1-\frac{a}{2}}(n-1)$$

refers to a probability of the distribution model when the value of the variance parameter is $$1 - \frac{a}{2}, \text{ and } x_{\frac{a}{2}}(n-1)$$

refers to a probability of the distribution model when the value of the variance parameter is $$\frac{a}{2}.$$

As used herein, the commence coefficient of the distribution model may indicate how reliable the distribution model may be.

According to formula (30) and formula (31), the processing engine 112 may further determine the fluctuation range as below:

$$F = \left[\frac{(n-1)\cdot D_2(X)}{x_{\frac{a}{2}}^2(n-1)}, \frac{(n-1)\cdot D_2(X)}{x_{1-\frac{a}{2}}^2(n-1)}\right] \tag{32}$$

where F refers to the fluctuation range relating to the second variance. The fluctuation range may indicate a range within which the value of the variance may vary.

It should be noted that the fluctuation range relating to the second variance is provided for illustration purposes, and not intended to limit the scope of the present disclosure. For example, similar processes or operations may be applied on the first variance or the third variance.

In step 506, the processing engine 112 may obtain a plurality of variance values based on the fluctuation range relating to the variance. For example, the fluctuation range may be [p, q]. The processing engine 112 may select the plurality of variance values within the range [p, q].

In step 508, for each of the plurality of variance values, the processing engine 112 may determine a first predicted distribution of future transportation service time point based on the variance value. As described in connection with step 406, the processing engine 112 may determine the first predicted distribution (e.g., a normal distribution) of future transportation service time point based on the variance value and the expectation of the historical service time points. The processing engine 112 may determine a plurality of first predicted distributions based on the plurality of variance values.

In step 510, the processing engine 112 may determine a second predicted distribution of future transportation service time point based on the plurality of first predicted distributions. The processing engine 112 may determine a combination of the plurality of first predicted distributions as the second predicted distribution. For example, the processing engine 112 may weigh the plurality of first predicted distributions of future transportation service time point and determine the second predicted distribution of future transportation service time point based on the weighing result.

FIGS. 6-A and 6-B are schematic diagrams illustrating exemplary predicted distributions of future transportation service time point according to some embodiments of the present disclosure.

As illustrated in FIG. 6-A, the processing engine 112 may determine a first variance value based on the fluctuation range and determine a forth normal distribution 609a based on the first variance value and the expectation of the historical service time points. As illustrated in FIG. 6-B, the processing engine 112 may determine a second variance value based on the fluctuation range and determine a fifth normal distribution 609b based on the second variance value and the expectation of the historical service time points. The processing engine 112 may select the first variance value or the second variance value randomly within the fluctuation range. For example, if the fluctuation range is $[u_1, u_n]$, the processing engine 112 may select a variance value $u_a$ and a variance value $u_b$ from the fluctuation range, and determine the fourth normal distribution 609a based on variance value $u_a$ and the fifth normal distribution 609b based on variance value $u_b$.

As illustrated in FIG. 6-A or FIG. 6-B, the horizontal coordinate refers to possible future service time point, the vertical coordinate refers to probability corresponding to the future service time.

In some situations, a user (e.g., a requestor or a provider) or the processing engine 112 may define a probability threshold 605. For the first normal distribution 609a, the processing engine 112 may determine a first interval 607a in which probabilities corresponding to possible future service time points are larger than the probability threshold 605. For the second normal distribution 609b, the processing engine 112 may determine a second interval 609b in which probabilities corresponding to possible future service time points are larger than the probability threshold 605.

The processing engine 112 may further process the first interval 607a and the second interval 607b, for example, determine a union or an intersection of the first interval 607a and the second interval 607b, average or weigh the first interval 607a and the second interval 607b.

For example, the first interval 607a may be [8:00, 9:30], the second interval 607b may be [9:00, 10:00]. The processing engine 112 may determine a union of the first interval 607a and the second interval 607b as [8:00, 10:00]. As another example, the processing engine 112 may determine an intersection of the first interval 607a and the second interval 607b as [9:00, 9:30]. As a further example, the processing engine 112 may determine an average of the first interval 607a and the second interval 607b as [8:30, 9:45].

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system specially configured to improve vehicle supply management of online transportation services, comprising:
a storage medium including a set of instructions; and
logic circuits in communication with the storage medium, wherein when executing the set of instructions, the logic circuits are configured to cause the system to:
obtain individual historical service time points of transportation service requests in a first predetermined time period occurred in a predetermined region, which includes a position located by a position locating device associated with a user terminal;
determine a number count of the individual historical service time points;
determine a relationship between the number count and at least one of a first threshold or a second threshold, the first threshold being larger than the second threshold, the relationship including at least one of the number count being larger than or equaling to the first threshold, the number count being less than the first threshold but being larger than or equaling to the second threshold, or the number count being less than the second threshold;

determine a variance of the individual historical service time points based on the relationship corresponding to different methods;

determine a predicted distribution of individual future transportation service time point in the predetermined region based on the variance, the expectation time point, the predicted distribution of individual future transportation service time point being a normal distribution;

receive, via an internet, a real-time request of a transportation service frequency that is associated with a second predetermined time period from the user terminal, the request being initiated via a user interface of the user terminal;

obtain a graph of a result transportation service frequency by applying the second predetermined time period to the predicted distribution; and send out, via the Internet, the graph of the result transportation service frequency to the user interface of the user terminal in real-time.

2. The system of claim 1, wherein the logic circuits are further configured to cause the system to determine an average time point of the individual historical service time points, and the predicted distribution of individual future transportation service time point is further determined based on the average time point of the individual historical service time points.

3. The system of claim 2, wherein to determine the variance of the individual historical service time points based on the relationship corresponding to different methods, the logic circuits further:

determine that the number count is larger than or equals to the first threshold; and determine the variance of the individual historical service time points based on the average time point of the individual historical service time points and the number count of the individual historical service time points.

4. The system of claim 2, wherein to determine the variance of the individual historical service time points based on the relationship corresponding to different methods, the logic circuits further:

determine that the number count is larger than or equals to the first threshold;

determine that the number count of the individual historical service time points is smaller than the second threshold;

determine a preliminary variance of the individual historical service time points based on the average time point of the individual historical service time points and the number count of the individual historical service time points;

determine a correction coefficient relating to the number count of the individual historical service time points; and apply the correction coefficient to the preliminary variance of the individual historical service time points to obtain the variance of the individual historical service time points.

5. The system of claim 1, wherein to determine the predicted distribution of individual future transportation service time point, the logic circuits further:

determine a variance parameter based on the variance, the number count and an actual variance of individual historical service time points in the first predetermined time period;

determine a fluctuation range of the actual variance based on the variance parameter and a confidence coefficient of the variance parameter; and determine the predicted distribution of individual future transportation service time point based on the fluctuation range.

6. The system of claim 5, wherein the variance parameter relates to a quadratic sum of multiple normal distribution variables.

7. The system of claim 5, wherein to determine the predicted distribution of individual future transportation service time point based on the variance, the logic circuits further:

obtain a plurality of the actual variance values based on the fluctuation range of the actual variance;

for each of the plurality of the actual variance values, determine a first predicted distribution of individual future transportation service time point based on the actual variance value; and determine a second predicted distribution of individual future transportation service time point based on a plurality of first predicted distributions of future transportation service time point.

8. The system of claim 7, wherein to determine the second predicted distribution of individual future transportation service time point, the logic circuits further:

weigh the plurality of first predicted distributions of individual future transportation service time point; and determine the second predicted distribution of individual future transportation service time point based on the weighing result.

9. A method implemented on at least one electronic device to improve vehicle supply management of online transportation services, comprising:

obtaining, by the at least one electronic device, individual historical service time points of transportation service requests in a first predetermined time period occurred in a predetermined region, which includes a position located by a position locating device associated with a user terminal;

determining, by the at least one electronic device, a number count of the individual historical service time points;

determining, by the at least one electronic device, a relationship between the number count and at least one of a first threshold or a second threshold, the first threshold being larger than the second threshold, the relationship including at least one of the number count being larger than or equaling to the first threshold, the number count being less than the first threshold but being larger than or equaling to the second threshold, or the number count being less than the second threshold;

determining, by the at least one electronic device, a variance of the individual historical service time points based on the relationship corresponding to different methods;

determining, by the at least one electronic device, a predicted distribution of individual future transportation service time point in the predetermined region based on the variance, the expectation time point, the predicted distribution of individual future transportation service time point being a normal distribution;

receiving, via an internet, a real-time request of a transportation service frequency that is associated with a second predetermined time period from the user terminal, the request being initiated via a user interface of the user terminal;

obtaining, by the at least one electronic device, a graph of a result transportation service frequency by applying the second predetermined time period to the predicted distribution; and sending out, via the Internet, the graph of the result transportation service frequency to the user interface of the user terminal in real-time.

10. The method of claim 9, further comprising determining an average time point of the individual historical service time points, and the predicted distribution of individual future transportation service time point is further determined based on the average time point of the individual historical service time points.

11. The method of claim 10, wherein the determining the variance of the individual historical service time points based on the relationship corresponding to different methods comprises:

determining that the number count is larger than or equals to the first threshold; and determining the variance of the individual historical service time points based on the average time point of the individual historical service time points and the number count of the individual historical service time points.

12. The method of claim 10, wherein the determining the variance of the individual historical service time points based on the relationship corresponding to different methods comprises:

determining that the number count is larger than or equals to the first threshold;

determining that the number count of the individual historical service time points is smaller than the second threshold;

determining a preliminary variance of the individual historical service time points based on the average time point of the individual historical service time points and the number count of the individual historical service time points;

determining a correction coefficient relating to the number count of the individual historical service time points; and applying the correction coefficient to the preliminary variance of the individual historical service time points to obtain the variance of the individual historical service time points.

13. The method of claim 9, wherein the determining the predicted distribution of individual future transportation service time point comprises:

determining a variance parameter based on the variance, the number count and an actual variance of individual historical service time points in the first predetermined time period;

determining a fluctuation range of the actual variance based on the variance parameter and a confidence coefficient of the variance parameter; and determining the predicted distribution of individual future transportation service time point based on the fluctuation range.

14. The method of claim 13, wherein the variance parameter relates to a quadratic sum of multiple normal distribution variables.

15. The method of claim 13, wherein the determining the predicted distribution of individual future transportation service time point based on the variance comprises:

obtaining a plurality of the actual variance values based on the fluctuation range of the actual variance;

for each of the plurality of the actual variance values, determining a first predicted distribution of individual future transportation service time point based on the actual variance value; and determining a second predicted distribution of individual future transportation service time point based on a plurality of first predicted distributions of future transportation service time point.

16. The method of claim 15, wherein the determining the second predicted distribution of individual future transportation service time point comprises:

weighing the plurality of first predicted distributions of individual future transportation service time point; and determining the second predicted distribution of individual future transportation service time point based on the weighing result.

17. A non-transitory computer readable medium comprising executable instructions for improving vehicle supply management of online transportation services, when executed by at least one processor, cause the at least one processor to effectuate a method comprising:

obtaining individual historical service time points of transportation service requests in a first predetermined time period occurred in a predetermined region, which includes a position located by a position locating device associated with a user terminal;

determining a number count of the individual historical service time points;

determining a relationship between the number count and at least one of a first threshold or a second threshold, the first threshold being larger than the second threshold, the relationship including at least one of the number count being larger than or equaling to the first threshold, the number count being less than the first threshold but being larger than or equaling to the second threshold, or the number count being less than the second threshold;

determining a variance of the individual historical service time points based on the relationship corresponding to different methods;

determining a predicted distribution of individual future transportation service time point in the predetermined region based on the variance, the expectation time point, the predicted distribution of individual future transportation service time point being a normal distribution;

receiving, via an internet, a real-time request of a transportation service frequency that is associated with a second predetermined time period from the user terminal, the request being initiated via a user interface of the user terminal;

obtaining a graph of a result transportation service frequency by applying the second predetermined time period to the predicted distribution; and sending out, via the Internet, the graph of the result transportation service frequency to the user interface of the user terminal in real-time.

18. The non-transitory computer readable medium of claim 17, the method further comprising determining an average time point of the individual historical service time points, and the predicted distribution of individual future transportation service time point is further determined based on the average time point of the individual historical service time points.

19. The non-transitory computer readable medium of claim 18, wherein the determining the variance of the individual historical service time points based on the relationship corresponding to different methods comprises:
   determining that the number count is larger than or equals to the first threshold; and
   determining the variance of the individual historical service time points based on the average time point of the individual historical service time points and the number count of the individual historical service time points.

20. The non-transitory computer readable medium of claim 17, wherein the determining the predicted distribution of individual future transportation service time point comprises:
   determining a variance parameter based on the variance, the number count and an actual variance of individual historical service time points in the first predetermined time period;
   determining a fluctuation range of the actual variance based on the variance parameter and a confidence coefficient of the variance parameter; and
   determining the predicted distribution of individual future transportation service time point based on the fluctuation range.

* * * * *